(12) United States Patent  (10) Patent No.: US 8,712,106 B2
Uchida et al.  (45) Date of Patent: Apr. 29, 2014

(54) IMAGE PROCESSING APPARATUS, IMAGE PROCESSING METHOD, AND PROGRAM

(75) Inventors: Masaki Uchida, Chiba (JP); Koji Aoyama, Saitama (JP)

(73) Assignee: Sony Corporation (JP)

( * ) Notice: Subject to any disclaimer, the term of this patent is extended or adjusted under 35 U.S.C. 154(b) by 176 days.

(21) Appl. No.: 13/449,962

(22) Filed: Apr. 18, 2012

(65) Prior Publication Data

US 2012/0275655 A1 Nov. 1, 2012

(30) Foreign Application Priority Data

Apr. 27, 2011 (JP) ................................. 2011-099539

(51) Int. Cl.
G06K 9/00 (2006.01)
(52) U.S. Cl.
USPC ........................................................... 382/107
(58) Field of Classification Search
CPC ........... G06T 2207/10016; G06T 7/20; G06K 9/6202; H04N 5/357; H04N 7/26973
USPC .............. 348/154, 413.1, 416.1, 699, E7.007, 348/E7.013; 382/107, 221, 236; 386/E9.006, E5.04; 702/17, 191, 195
See application file for complete search history.

(56) References Cited

U.S. PATENT DOCUMENTS 6,771,793 B1 *  8/2004  Yamada ......................... 382/264
2007/0115286 A1 *  5/2007  Kondo et al. .................. 345/426

FOREIGN PATENT DOCUMENTS

JP  2001-160909 A  6/2001

* cited by examiner

*Primary Examiner* — Gregory F Cunningham
(74) *Attorney, Agent, or Firm* — Lerner, David, Littenberg, Krumholz & Mentlik, LLP

(57) ABSTRACT

An image processing apparatus includes a flatness detector, a difference calculation section, a noise level detector, and a motion detector. The flatness detector detects a flat region where pixel values of pixels on a first image are flat, based on variances of the pixel values of the pixels constituting the first image inputted. The difference calculation section calculates a difference between the pixel values of the pixels corresponding to the first image and a second image which continues before or after the first image. The noise level detector detects a noise level indicating a statistic noise amount of noise generated in each pixel constituting the first image based on the variances of the difference. The motion detector detects at least one of a still region indicating a region where an object on the first image is still and a motion region indicating a region where the object is moving.

8 Claims, 15 Drawing Sheets

IMAGE PROCESSING APPARATUS, IMAGE PROCESSING METHOD, AND PROGRAM

CROSS-REFERENCE TO RELATED APPLICATION

The present application claims priority from Japanese Patent Application No. JP 2011-099539 filed in the Japanese Patent Office on Apr. 27, 2011, the entire content of which is incorporated herein by reference.

BACKGROUND

The present disclosure relates to an image processing apparatus, an image processing method, and a program and more particularly to an image processing apparatus, an image processing method, and a program capable of accurately detecting, from an image, at least one of a motion region in which a moving object is displayed and a still region in which a motionless object is displayed, for example.

There is, for example, a noise reduction technology for performing different noise reduction processing between a moving region and a still region by detecting the moving region and the still region from an image (see Japanese Patent Application Laid-Open No. 2001-160909, for example).

According to the noise reduction technology, the image is divided into a plurality of blocks, and block matching or the like is utilized to detect a motion vector indicating the motion of the blocks for every plurality of blocks. Moreover, based on the motion vector detected for each block, it is detected whether the block is the motion region or the still region.

The block detected as the motion region is subjected to a first noise reduction processing for reducing noise in a spatial direction and the block detected as the still region is subjected to a second noise reduction processing for reducing noise in a time direction.

SUMMARY

However, in the above-described noise reduction technology, as a noise amount indicating the noise amount generated on the image increases, the motion vector of each block is erroneously detected due to the noise.

Therefore, for example, there may arise a problem in that the block to be detected as the still region is detected as the motion region and the detected block is subjected to the first noise reduction processing. Also, on the contrary, there may arise a problem in that the block to be detected as the motion region is detected as the still region and the detected block is subjected to the second noise reduction processing.

Accordingly, to reduce noise on the image effectively, it may be necessary to detect the motion region and the still region on the image accurately.

The present disclosure is conceived in view of the above-described circumstances so as to accurately detect at least one of the motion region and the still region on the image.

According to an embodiment of the present disclosure, there is provided an image processing apparatus includes: a flatness detector configured to detect a flat region where pixel values of pixels on a first image are flat based on variances of the pixel values of the pixels constituting the first image inputted; a difference calculation section configured to calculate a difference between the pixel values of the pixels corresponding to the first image and a second image which continues before or after the first image; a noise level detector configured to detect a noise level indicating a statistic noise amount of noise generated in each pixel constituting the first image based on the variances of the difference corresponding to each pixel constituting the flat region on the first image; and a motion detector configured to detect at least one of a still region indicating a region where an object on the first image is still and a motion region indicating a region where the object is moving, based on a comparison result between the variances of the difference corresponding to each pixel constituting the first image and the noise level.

The image processing apparatus may further include a noise property detector configured to detect noise property information indicating property of the noise generated in the still region based on the difference corresponding to each pixel constituting the still region on the first image.

The noise property detector may detect, as the noise property information, a maximum value of a plurality of power levels obtained by separating the difference corresponding to each pixel constituting the still region into predetermined frequency components, the maximum value being obtained for each of the frequency components.

The image processing apparatus may further include a noise reduction section configured to reduce the noise generated in the first image based on at least one of the noise property information and the noise level.

The noise reduction section may include a first correction amount calculation section configured to calculate a first correction amount for reducing the noise generated in the still region based on the noise property information a second correction amount calculation section configured to calculate a second correction amount for reducing the noise generated in the motion region based on the noise level a mixing section configured to mix the first correction amount and the second correction amount and a correction section configured to correct the pixel value of each pixel of the first image based on a third correction amount obtained by mixing in the mixing section.

The noise level detector may detect, as the noise level, a mode of the variance among the variances of the difference corresponding to each pixel constituting the flat region on the first image.

According to an embodiment of the present disclosure, there is provided an image processing method for an image processing apparatus configured to process an image to be inputted, the method including: by the image processing apparatus, detecting a flat region where pixel values of pixels on a first image are flat based on variances of the pixel values of the pixels constituting the first image inputted; calculating a difference between the pixel values of the pixels corresponding to the first image and a second image which continues before or after the first image; detecting a noise level indicating a statistic noise amount of noise generated in each pixel constituting the first image based on the variances of the difference corresponding to each pixel constituting the flat region on the first image; and detecting at least one of a still region indicating a region where an object on the first image is still and a motion region indicating a region where the object is moving, based on a comparison result between the variances of the difference corresponding to each pixel constituting the first image and the noise level.

According to an embodiment of the present disclosure, there is provided a program that causes a computer to function as: a flatness detector configured to detect a flat region where pixel values of pixels on a first image are flat based on variances of the pixel values of the pixels constituting the first image inputted; a difference calculation section configured to calculate a difference between the pixel values of the pixels corresponding to the first image and a second image which continues before or after the first image; a noise level detector configured to detect a noise level indicating a statistic noise amount of noise generated in each pixel constituting the first image based on the variances of the difference corresponding to each pixel constituting the flat region on the first image; and a motion detector configured to detect at least one of a still region indicating a region where an object on the first image is still and a motion region indicating a region where the object is moving, based on a comparison result between the variances of the difference corresponding to each pixel constituting the first image and the noise level.

According to the embodiment of the present disclosure, the flat region where the pixel values of the pixels on the first image based on variance of the pixel values of the pixels constituting the first image inputted are flat is detected, the difference between the pixel values of the pixels corresponding to the first image and the second image which continues before or after the first image is calculated, the noise level indicating the statistic noise amount of the noise generated in each pixel constituting the first image is detected based on the variance of the difference corresponding to each pixel constituting the flat region on the first image, and at least one of the still region indicating the region where the object on the first image is still and the motion region indicating the region where the object is moving is detected based on the comparison result between the variances of the difference corresponding to each pixel constituting the first image and the noise level.

According to the embodiment of the present disclosure, it is possible to accurately detect at least one of the motion region and the still region on the image.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure (hereinafter referred to as embodiments) will be described.

The description will be given in the following order.

1. First embodiment (example of performing a motion adaptive noise reduction by distinguishing between a still region and a motion region in accordance with a noise level)

2. Second embodiment (example of performing a motion compensation noise reduction by distinguishing between the still region and the motion region in accordance with the noise level).

3. Modifications

1. First Embodiment

[Configuration Example of Image Processing Apparatus 21]

Figure 1:
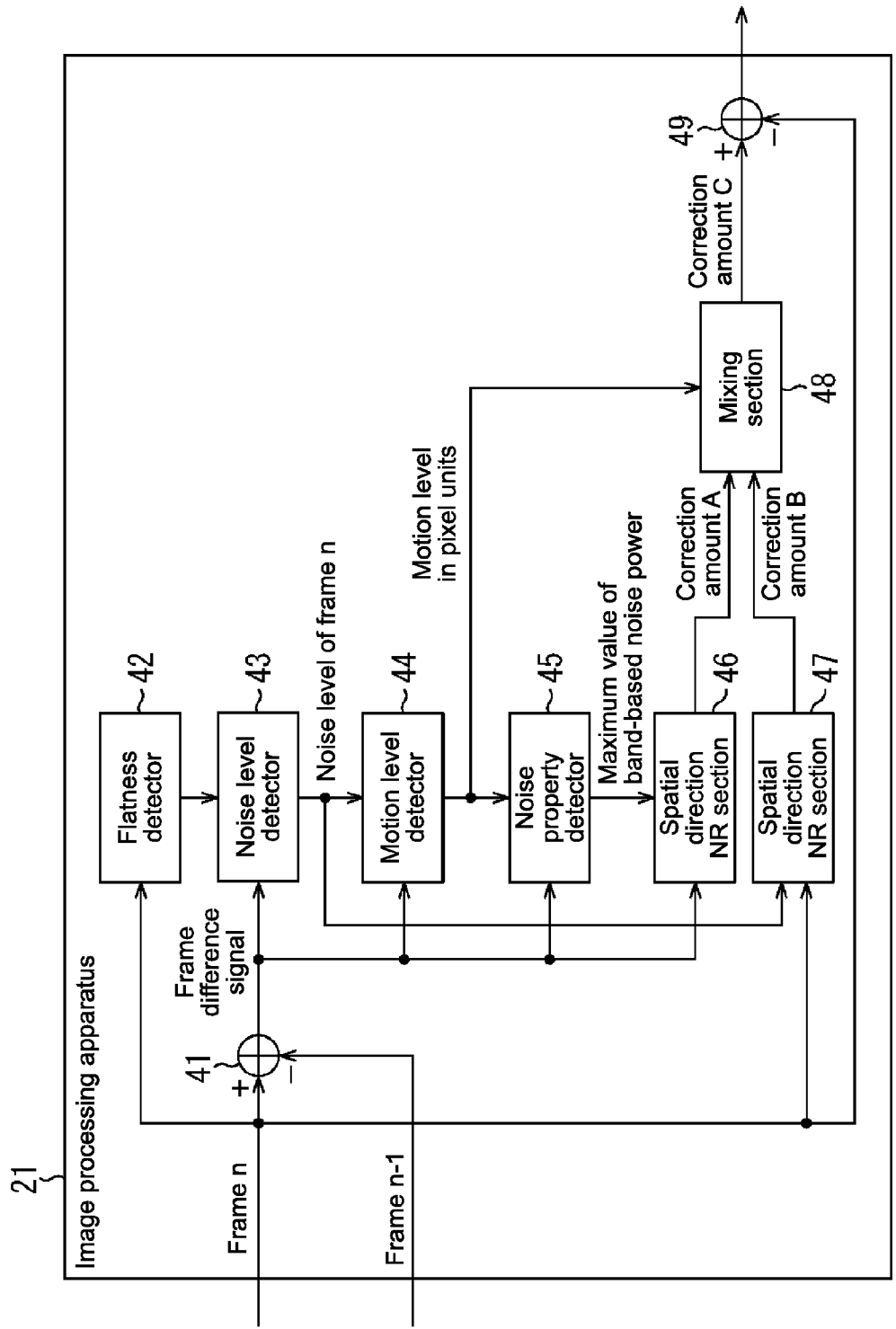
FIG. 1 is a block diagram showing a configuration example of an image processing apparatus according to a first embodiment.

FIG. 1 illustrates a configuration example of an image processing apparatus 21 in accordance with the first embodiment.

Further, the image processing apparatus 21 is disposed between an imaging section (not shown) which performs imaging and a hard disk (not shown) which stores a moving image including frames each acquired by the imaging, for example. Then, the image processing apparatus 21 performs noise removal processing to remove (reduce) noise generated in the n-th frame n acquired by imaging by the imaging, section and supplies the noise-removed frame n to the hard disk for storage.

In this embodiment, although the noise removal generated in (an image of) the frame will be described, it is also possible to remove noise in (an image of) a field, for example.

The image processing apparatus 21 includes a difference calculation section 41, a flatness detector 42, a noise level detector 43, a motion level detector 44, a noise property detector 45, a time direction NR (noise reduction) section 46, a spatial direction NR section 47, a mixing section 48, and a correction section 49.

The difference calculation section 41 receives a frame n−1 and a frame n acquired by imaging by the imaging section not shown, for example.

The difference calculation section 41 subtracts a luminance value $Y(x,y)'$ on the frame n−1 from a luminance value $Y(x,y)$ on the frame n and supplies a difference value diffy $(x,y)$ obtained by the subtraction to the noise level detector 43 through the time direction NR section 46 as a frame difference signal.

In this case, for example, the luminance value $Y(x,y)$ represents a luminance value of a pixel $p(x,y)$ in a position $(x,y)$ when the upper left on the frame n is set as an origin$(0,0)$, a coordinate in a horizontal direction is set as x and a coordinate in a vertical direction is set as y. This also applies similarly to the luminance value $Y(x,y)'$.

Although, in the first embodiment, as the pixel value of the pixel on the frame n, a case where the luminance value $Y(x,y)$ is corrected to remove noise will be described, the pixel value which becomes a correction target is not limited to the luminance value $Y(x,y)$. That is, for example, with the luminance value Y(x,y) or in place of the luminance value Y(x,y), a color difference and the like can be correction targets.

The flatness detector 42 receives the frame n from the imaging section not shown. The flatness detector 42 successively focuses on each pixel p(x,y) of the frame n to be supplied and detects a flatness f(x,y) of the focused target pixel p(x,y).

That is, for example, the flatness detector 42 calculates a luminance average Ave0 of a block centering on the target pixel p(x,y) (hereinafter also referred to as a block of the target pixel p(x,y)) using the following expression (1).

$$Ave0 = \frac{1}{M \times N} \sum_x \sum_y Y(x, y) \quad (1)$$

Herein, a block of the target pixel p(x,y) includes M×N (crosswise×lengthwise) pixels centering on the target pixel p(x,y) and the luminance average Ave0 represents an average of the luminance value Y(x,y) of M×N pixels included in the block of the target pixel p(x,y).

The flatness detector 42 calculates a spatial variance var0 of the target pixel p(x,y) based on the calculated luminance average Ave0 and the luminance value Y(x,y) of M×N pixels including the block of the target pixel p(x,y) by the following expression (2).

$$Var0 = \frac{1}{M \times N} \sum_x \sum_y |Y(x, y) - Ave0| \quad (2)$$

Herein, the spatial variance var0 represents a variance of the luminance value Y(x,y) of the target pixel p(x,y). Moreover, as the spatial variance var0 is smaller, (a region represented by) the block of the target pixel p(x,y) on the frame n becomes a region where the luminance value Y(x,y) of each pixel is flat. That is, a region where the luminance value Y(x,y) of each pixel in the block of the target pixel p(x,y) is (almost) the same, namely, a region where the luminance value Y(x,y) of each pixel in the block of the target pixel p(x,y) has no (little) change is formed.

Therefore, the flatness detector 42 detects an inverse number 1/var0 of the spatial variance var0 of the target pixel p(x,y) as the flatness f(x,y) (=1/var0) of the target pixel p(x,y). In this case, as the flatness f(x,y) increases, the corresponding target pixel p(x,y) is flat.

The flatness detector 42 determines whether or not the flatness f(x,y) detected for each pixel p(x,y) on the frame n is greater than or equal to a predetermined threshold.

Then, based on the determined result, the flatness detector 42 detects, as a flat region D(x,y), the flat region having the pixel p(x,y) corresponding to the flatness f(x,y) which is greater than or equal to the predetermined threshold and supplies it to the noise level detector 43.

The noise level detector 43 detects, among a plurality of difference values diffy(x,y) as the frame difference signal from the difference calculation section 41, a noise level of the frame n based on the difference value diffy(x,y) corresponding to the flat region D(x,y) from the flatness detector 42.

Herein, the noise level represents a statistic amount of noise generated in each pixel p(x,y) on the frame n.

It should be noted that the noise level detector 43 detects the noise level using the difference value diffy(x,y) corresponding to the flat region D(x,y) for the following reason.

That is, mainly due to a motion and the like of the object on the frame, the difference value diffy(x,y) is changed by dislocation of the pixels corresponding to the frame n−1 and the frame n and the noise generated in the pixels on the frame.

As described above, the noise level detector 43 detects the noise level representing the statistic noise amount of noise generated in each pixel p(x,y) on the frame n. Therefore, it is desirable that the difference value diffy(x,y) used for the noise level detection satisfy conditions that the difference value diffy(x,y) is not changed by dislocation of the corresponding pixels and is changed by the noise generated in the pixel on the frame.

As described above, the flat region D(x,y) is the region where the luminance value Y(x,y) of each pixel having the flat region D(x,y) is (almost) the same. Therefore, even when dislocation occurs in the flat region D(x,y), the difference value diffy(x,y) corresponding to the flat region D(x,y) has little change and is changed by the noise generated in the pixel on the frame, so that the conditions described above are satisfied.

Thus, the noise level detector 43 detects the noise level based on the difference value diffy(x,y) corresponding to the flat region D(x,y).

That is, for example, the noise level detector 43 successively focuses on each pixel $p(x,y)_d$ including the flat region D(x,y) on the frame n and calculates a differential average Ave1 in the block of the focused target pixel $p(x,y)_d$ by the following expression (3).

$$Ave1 = \frac{1}{M \times N} \sum_x^M \sum_y^N diffy(x, y) \quad (3)$$

Herein, the differential average Ave1 represents an average of the difference value diffy(x,y) corresponding to each pixel including the block of the target pixel $p(x,y)_d$.

The noise level detector 43 calculates a time variance var1 of the target pixel $p(x,y)_d$ based on the calculated differential average Ave1 and the difference value diffy(x,y) corresponding to each pixel including the block of the target pixel $p(x,y)_d$ by the following expression (4).

$$Var1 = \frac{1}{M \times N} \sum_x^M \sum_y^N |diffy(x, y) - Ave1| \quad (4)$$

Herein, the time variance var1 represents a variance of the difference value diffy(x,y) corresponding to the target pixel $p(x,y)_d$.

In this case, the noise level detector 43 calculates the time variance var1 for each pixel $p(x,y)_d$ on the flat region D(x,y) where the difference value diffy(x,y) changes by only the noise generated in the pixel on the frame.

Therefore, the time variance var1 represents a noise amount generated in each pixel $p(x,y)_d$ on the flat region D(x,y).

Figure 2:
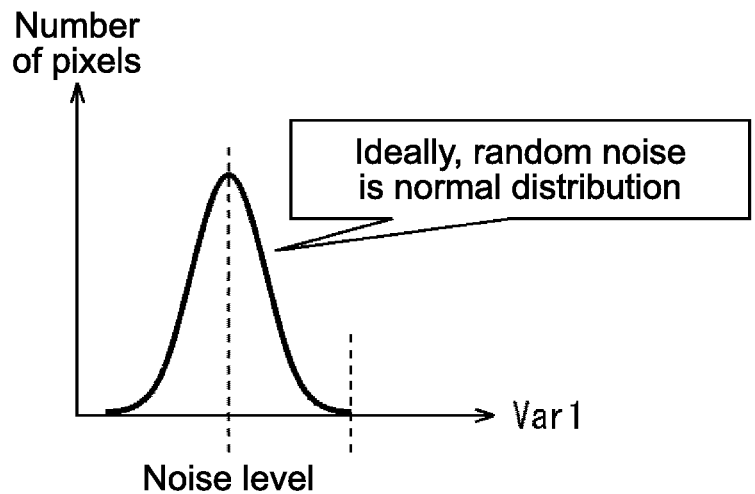
FIG. 2 is a diagram showing an example of a histogram to detect a noise level.

The noise level detector 43 focuses on all the pixel $p(x,y)_d$ including the flat region D(x,y) on the frame n and calculates the time variance var1 for each pixel $p(x,y)_d$. Then, the noise level detector 43 measures a histogram as shown in FIG. 2 based on the calculated time variance var1 for each pixel $p(x,y)_d$. It should be noted that, in FIG. 2, a horizontal axis represents the time variance var1 and a vertical axis represents the number of pixels for the pixel $p(x,y)_d$.

The noise level detector 43 supplies the maximum portion of the measured histogram (the highest-frequency time variance var1) to the motion level detector 44 as a noise level.

The motion level detector 44 calculates the time variance var1 of each pixel p(x,y) on the frame n based on the difference value diffy(x,y) as the frame difference signal from the difference calculation section 41 by the expressions (3) and (4).

Then, the motion level detector 44 detects a still region Ds(x,y) on the frame n based on whether or not the calculated time variance var1 of each pixel p(x,y) on the frame n is equal to or less than the noise level from the noise level detector 43.

It should be noted that the still region Ds(x,y) represents a region where an object on the region Ds(x,y) is still (not moving) and a region where the corresponding difference value diffy(x,y) is less than a predetermined threshold.

Herein, in the still region Ds(x,y), since the object on the still region Ds(x,y) is still, the difference value diffy(x,y) increases due to the noise without increasing the difference value diffy(x,y) by the motion of the object.

Therefore, the time variance var1 of the pixel p(x,y) on the still region Ds(x,y) is equal to or less than the noise level representing a statistic noise amount generated in each pixel p(x,y) on the frame n.

Moreover, in the motion region on the frame n, the difference value diffy(x,y) increases due to the motion of the object on the motion region as well as the noise generated in the pixel. It should be noted that the motion region represents a region where the object on the region is moving and a region where the corresponding difference value diffy(x,y) is greater than or equal to the predetermined threshold.

Therefore, the time variance var1 of the pixel p(x,y) on the motion region is greater than the noise level representing the statistic noise amount generated in each pixel p(x,y) on the frame n.

Accordingly, as described above, the motion level detector 44 detects the still region Ds(x,y) on the frame n based on whether or not the calculated time variance var1 of each pixel p(x,y) on the frame n is equal to or less than the noise level from the noise level detector 43.

The motion level detector 44 supplies (information showing) the detected still region Ds(x,y) to the noise property detector 45.

Figure 3:
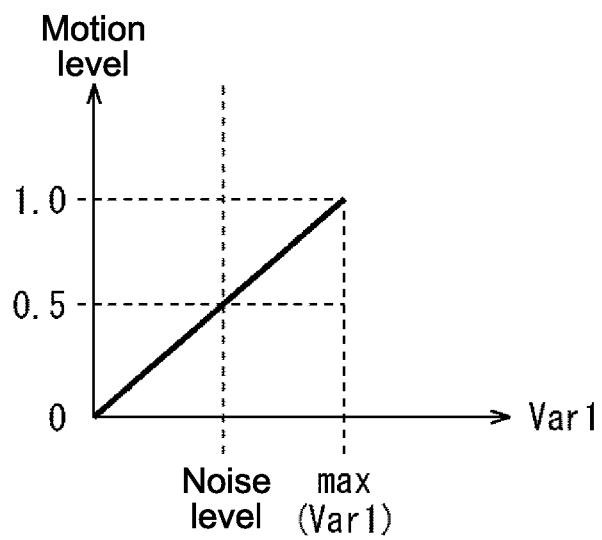
FIG. 3 is a diagram showing an example of a motion level.

Further, for example, as shown in FIG. 3, the motion level detector 44 normalizes (divides) the time variance var1 of each pixel p(x,y) on the frame n by the maximum time variance max(var1), detects the motion level of each pixel, and supplies it to the mixing section 48.

It should be noted that as shown in FIG. 3, when the motion level is 0.5 in case where the time variance var1 is the noise level, the pixel p(x,y) corresponding to the motion level equal to or less than 0.5 is the pixel p(x,y) on the still region Ds(x,y) and the pixel p(x,y) corresponding to the level greater than 0.5 is the pixel p(x,y) on the motion region.

The noise property detector 45 detects, among the plurality of difference values diffy(x,y) as the frame difference signal from the difference calculation section 41, noise property information representing property of noise generated in the still region Ds(x,y) based on the difference value diffy(x,y) corresponding to the still region Ds(x,y) from the motion level detector 44.

Herein, since the object on the still region Ds(x,y) is still (motionless) in the frame n−1 through the frame n, the difference value diffy(x,y) corresponding to the still region Ds(x,y) changes according to only noise generated on the still region Ds(x,y).

Therefore, the noise property detector 45 detects the noise property information based on the difference value diffy(x,y) corresponding to the still region Ds(x,y). The noise property detector 45 will be later described in detail with reference to FIG. 4.

The time direction NR section 46 calculates a correction amount A based on the difference value diffy(x,y) as the frame difference signal from the difference calculation section 41 and the noise property information from the noise property detector 45, and supplies the calculated amount to the mixing section 48.

Herein, the correction amount A is a value added to a negative value $\{-Y(x,y)\}$ of the luminance value Y(x,y) of the frame n for removing, in a time direction, noise generated in the still region Ds(x,y) on the frame n.

The process conducted by the time direction NR section 46 will be later described in detail with reference to FIGS. 8 and 9.

The spatial direction NR section 47 calculates a correction amount B based on the frame n from the imaging section not shown and the noise level from the noise level detector 43, and supplies the calculated amount to the mixing section 48.

Herein, the correction amount B is a value added to a negative value $\{-Y(x,y)\}$ of the luminance value Y(x,y) of the frame n for removing, in a spatial direction, noise generated in the motion region on the frame n.

The process conducted by the spatial direction NR section 47 will be later described in detail with reference to FIGS. 10 and 11.

The mixing section 48 mixes the correction amount A from the time direction NR section 46 and the correction amount B from the spatial direction NR section 47 for each pixel on the frame n based on the motion level for each pixel on the frame n from the motion level detector 44.

That is, for example, the mixing section 48 determines a weight (1−α) multiplied in the correction amount A and a weight α multiplied in the correction amount B based on the motion level from the motion level detector 44. However, the weight α is a value greater than or equal to zero but less than or equal to one.

Then, the mixing section 48 mixes the correction amount A and the correction amount B in a ratio of (1−α) to α and supplies the mixed result $\{(1-\alpha) \times A + \alpha \times B\}$ to the correction section 49 as a correction amount C. The process conducted by the mixing section 48 will be later described in detail with reference to FIGS. 12 and 13.

The correction section 49 corrects the frame n from the imaging section not shown based on the correction amount C from the mixing section 48 and supplies it to the hard disk not shown and the like for storage, for example.

That is, for example, among pixels of the frame n from the imaging section not shown, the correction section 49 subtracts the corresponding luminance value Y(x,y) from (adds the luminance value $Y\{-Y(x,y)\}$ to) the correction amount $C(=(1-\alpha)\times A+\alpha \times B)$ of each pixel on the frame n supplied from the mixing section 48.

Then, by the subtraction, the correction section 49 supplies the frame having a value obtained for each pixel on the frame n as the luminance value to the hard disk not shown and the like as the corrected frame n for storage.

[Details of Noise Property Detector 45]

Figure 4:
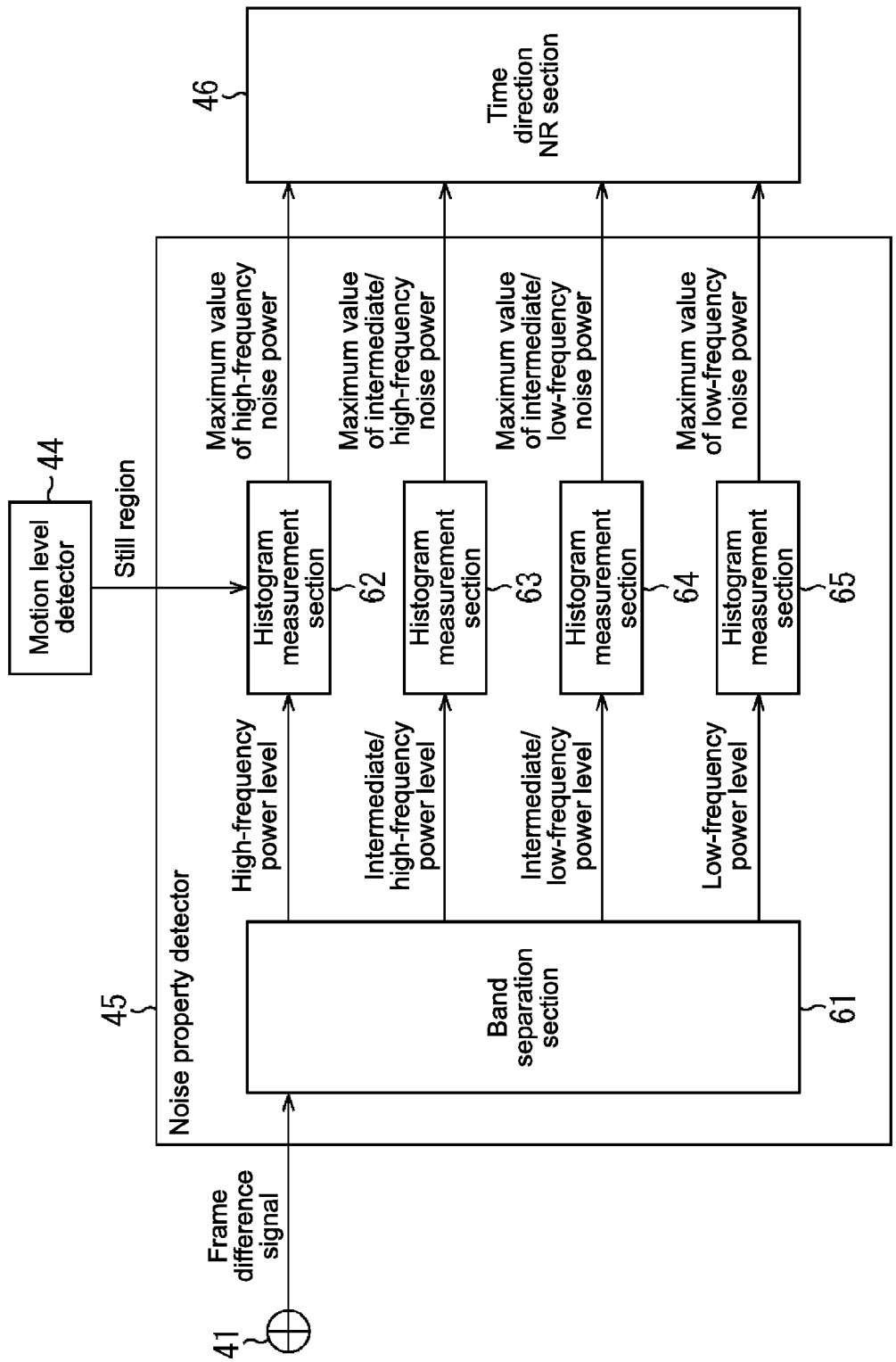
FIG. 4 is a block diagram showing a configuration example of a noise property detector in detail.

Next, FIG. 4 shows a configuration example of the noise property detector 45 in detail.

The noise property detector 45 includes a band separation section 61 and histogram measurement sections 62 to 65.

The band separation section 61 separates a frame difference signal from the difference calculation section 41 into a power level for different frequency components (for example, high-frequency component, intermediate/high-frequency component, intermediate/low-frequency component, and low-frequency component).

Herein, the power level is calculated for each difference value diffy(x,y) as the frame difference signal and is calculated by a product-sum operation of a filter coefficient used for separating into a predetermined frequency component and the difference value diffy(x,y) as the frame difference signal.

That is, for example, the band separation section 61 successively focuses on the difference values diffy(x,y) as the frame difference signal from the difference calculation section 41.

The band separation section 61 calculates, among difference frames corresponding to the frame difference signal, a product-sum operation of the difference value diffy(x,y) of each pixel including a block centering on the focused target difference value diffy(x,y) and a filter coefficient w for separating the high-frequency component.

Then, the band separation section 61 supplies a high-frequency power level of the target difference value diffy(x,y) obtained by the product-sum operation to the histogram measurement section 62. Accordingly, the histogram measurement section 62 receives the high-frequency power level for each difference value diffy(x,y) corresponding to the frame difference signal from the band separation section 61.

Figure 5:
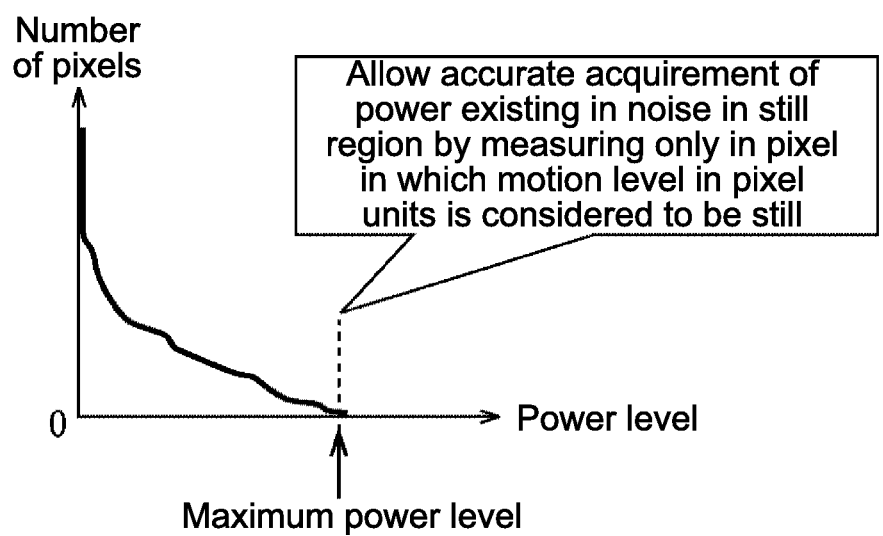
FIG. 5 is a diagram showing an example of a histogram of a power level.
Figures 6A, 6B, 6C, 6D:
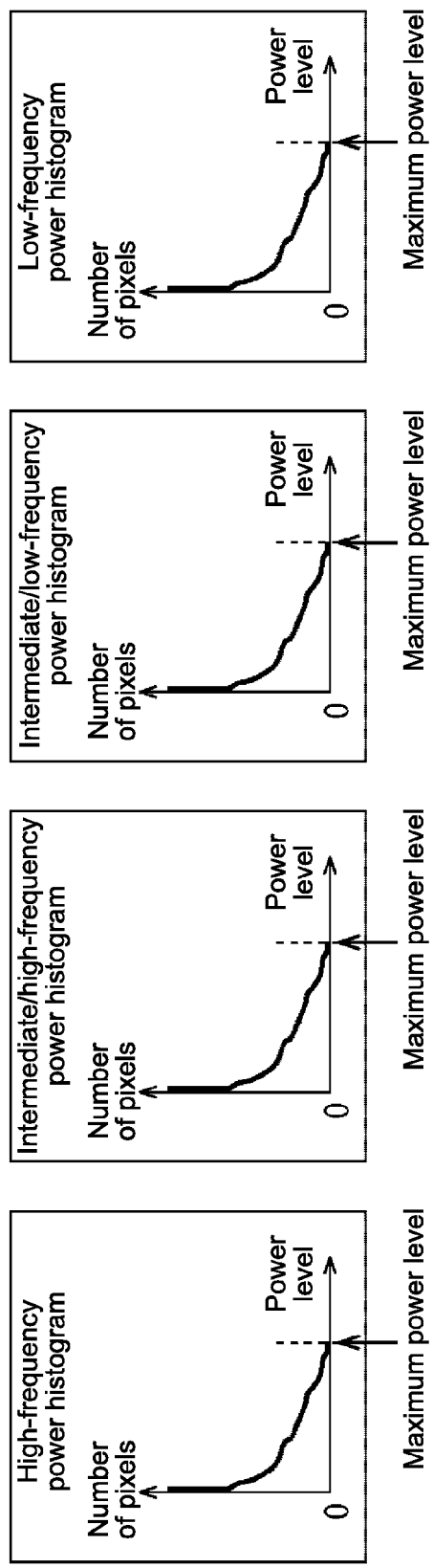
FIGS. 6A to 6D are diagrams showing an example of noise property information.
Figure 7D:
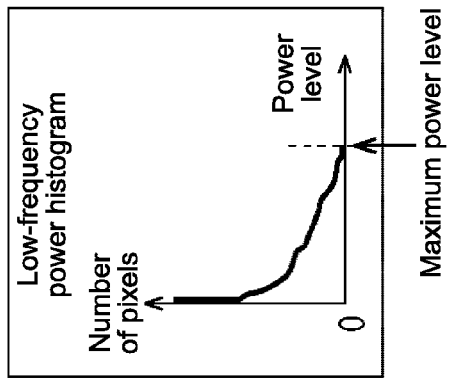
FIGS. 7A to 7D are diagrams showing another example of noise property information.
Figure 7C:
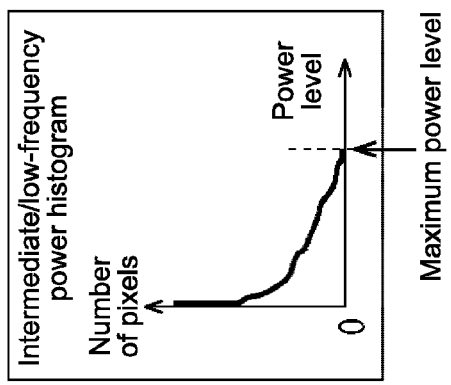
Figure 7B:
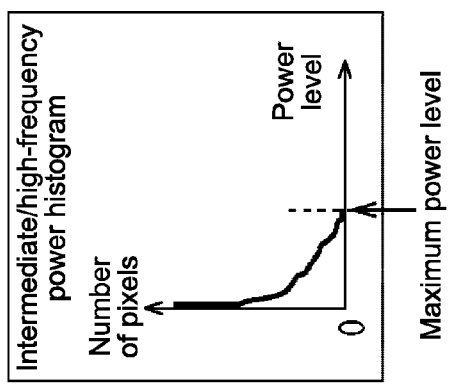
Figure 7A:
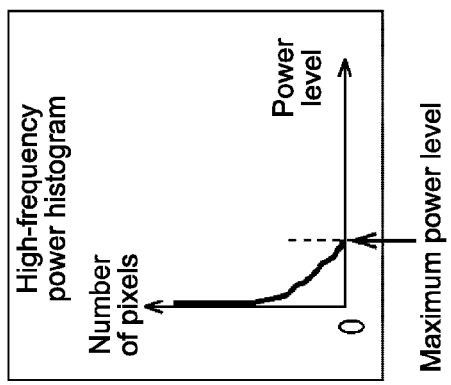

For a high-frequency power level PL(x,y) for each difference value diffy(x,y) corresponding to the still region Ds(x,y) from the motion level detector 44, the histogram measurement section 62 measures a histogram (high-frequency power histogram) of a distribution as shown in FIG. 5, for example. It should be noted that, in FIG. 5, the horizontal axis represents the high-frequency power level and the vertical axis represents the number of pixels on the still region Ds(x,y) corresponding to the high-frequency power level PL(x,y).

Herein, as described above, each difference value diffy(x,y) corresponding to the still region Ds(x,y) changes according to only noise generated in the still region Ds(x,y).

Thus, the high-frequency power level PL(x,y) represents the high-frequency power level of the noise generated in the high-frequency component of the still region Ds(x,y) on the frame n. Therefore, the high-frequency power histogram represents a distribution of the high-frequency power level of the noise generated in the high-frequency component of the still region Ds(x,y) on the frame n.

The histogram measurement section 62 supplies the maximum value of the high-frequency power level to the time direction NR section 46 as the maximum value of a high-frequency noise power based on the high-frequency power histogram.

Likewise, the band separation section 61 calculates an intermediate/high-frequency power level for each difference value diffy(x,y) corresponding to the frame difference signal and supplies it to the histogram measurement section 63. Moreover, the band separation section 61 calculates an intermediate/low-frequency power level for each difference value diffy(x,y) corresponding to the frame difference signal and supplies it to the histogram measurement section 64. Further, the band separation section 61 calculates a low-frequency power level for each difference value diffy(x,y) corresponding to the frame difference signal and supplies it to the histogram measurement section 65.

As with the histogram measurement section 62, the histogram measurement sections 63 to 65 receive the still region from the motion level detector 44 and the histogram measurement sections 63 to 65 conduct processing similar to that of the histogram measurement section 62.

That is, for example, the histogram measurement section 63 supplies the maximum value of the intermediate/high-frequency power level to the time direction NR section 46 as the maximum value of an intermediate/high-frequency noise power based on an intermediate/high-frequency power histogram. Moreover, the histogram measurement section supplies the maximum value of the intermediate/low-frequency power level to the time direction NR section 46 as the maximum value of an intermediate/low-frequency noise power based on an intermediate/low-frequency power histogram. Further, the histogram measurement section 65 supplies the maximum value of the low-frequency power level to the time direction NR section 46 as the maximum value of a low-frequency noise power based on a low-frequency power histogram.

In other words, the maximum value of the high-frequency noise power, the maximum value of the intermediate/high-frequency noise power, the maximum value of the intermediate/low-frequency noise power, and the maximum value of the low-frequency noise power are supplied to the time direction NR section 46 from the histogram measurement sections 62 to 65 as the noise property information, respectively.

Next, referring to FIGS. 6A to 6D and 7A to 7D, a description will be given of the maximum value of the high-frequency noise power, the maximum value of the intermediate/high-frequency noise power, the maximum value of the intermediate/low-frequency noise power, and the maximum value of the low-frequency noise power representing property of noise generated on the still region Ds(x,y).

FIGS. 6A to 6D show an example of noise property information of the frame n which is not compressed by moving picture experts group (MPEG) compression and the like.

FIGS. 6A to 6D show the maximum value of the high-frequency noise power, the maximum value of the intermediate/high-frequency noise power, the maximum value of the intermediate/low-frequency noise power, and the maximum value of the low-frequency noise power as the noise property information.

When the frame n is not compressed by MPEG compression and the like, as shown in FIGS. 6A to 6D, the maximum value of the high-frequency noise power, the maximum value of the intermediate/high-frequency noise power, the maximum value of the intermediate/low-frequency noise power, and the maximum value of the low-frequency noise power are almost equal.

That is, it is understood that the same noise occurs in any frequency component as property of noise generated in the still region Ds(x,y) on the frame n.

FIGS. 7A to 7D show an example of noise property information of the frame n compressed by MPEG compression and the like.

FIGS. 7A to 7D show the maximum value of the high-frequency noise power, the maximum value of the intermediate/high-frequency noise power, the maximum value of the intermediate/low-frequency noise power, and the maximum value of the low-frequency noise power as the noise property information.

When the frame n is compressed by MPEG compression and the like, the higher the frequency component, the coarser the quantization. Therefore, as shown in FIGS. 7A to 7D, it is obvious that as the frequency component is higher, the maximum value of the noise power is smaller.

That is, as property of the noise generated in the still region Ds(x,y) on the frame n, it is recognized that as the frequency component is higher, the maximum value of the noise power is smaller.

[Details of Time Direction NR Section 46]

Figure 8:
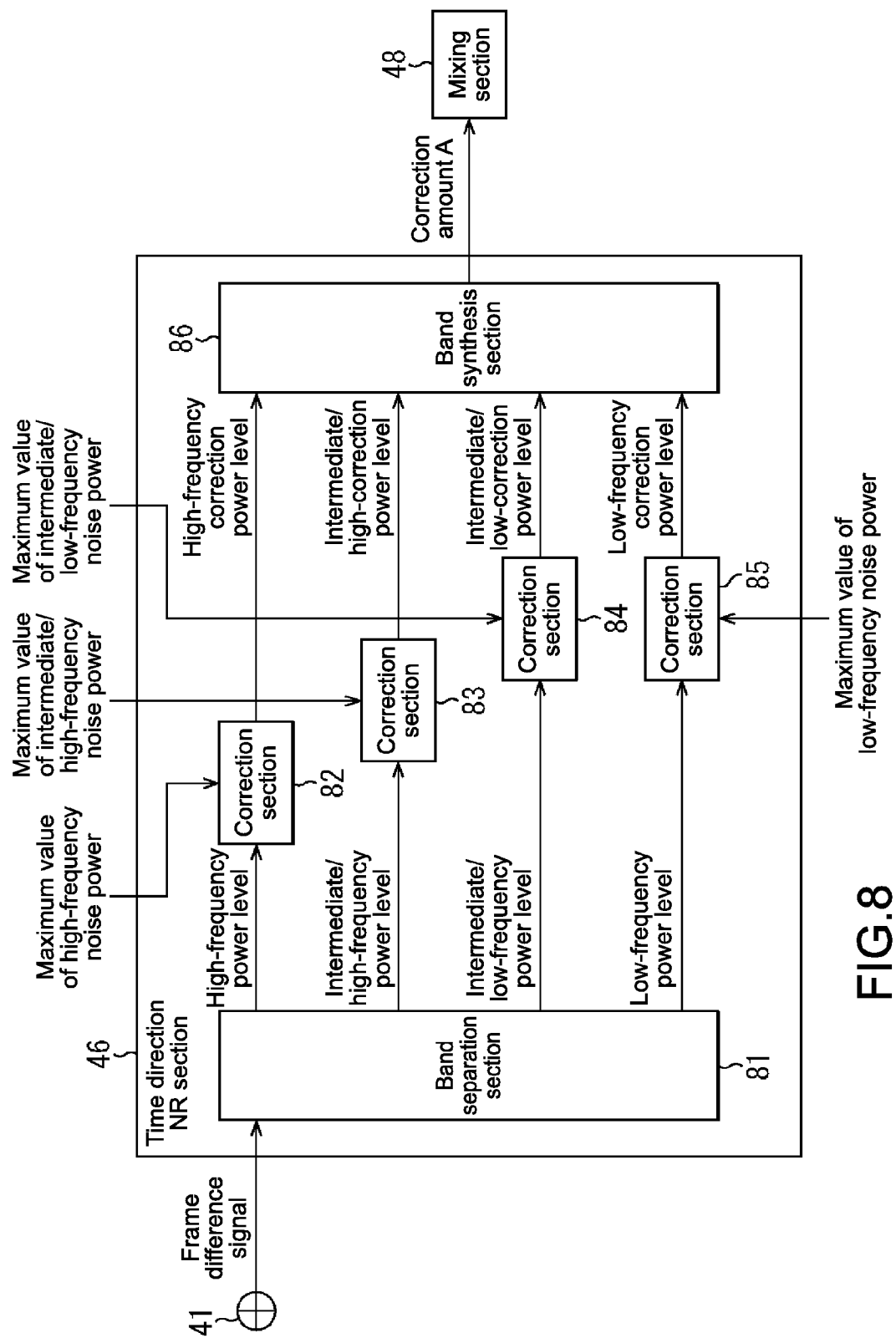
FIG. 8 is a block diagram showing a configuration example of a time direction NR section in detail.

Next, FIG. 8 shows a configuration example of the time direction NR section 46 in detail.

The time direction NR section 46 includes a band separation section 81, correction sections 82 to 85, and a band synthesis section 86.

As with the band separation section 61, the band separation section 81 separates the frame difference signal from the difference calculation section 41 into the high-frequency power level, the intermediate/high-frequency power level, the intermediate/low-frequency power level, and the low-frequency power level.

Then, the band separation section 81 supplies the high-frequency power level to the correction section 82, the intermediate/high-frequency power level to the correction section 83, the intermediate/low-frequency power level to the correction section 84, and low-frequency power level to the correction section 85, respectively.

The correction section 82 receives the maximum value of the high-frequency noise power from the histogram measurement section 62 shown in FIG. 4. The correction section 82 performs noise removal processing for the high-frequency power level less than or equal to the maximum value of the high-frequency noise power from the histogram measurement section 62 among the high-frequency power levels from the band separation section 81.

That is, the maximum value of the high-frequency noise power represents the maximum value of the high-frequency power level of the noise generated in the still region Ds(x,y) on the frame n. Therefore, the high-frequency power level less than or equal to the maximum value of the high-frequency noise power is not caused by the motion of the pixel but is caused by the noise, which is subjected to noise removal processing in a time direction.

Therefore, for example, the correction section 82 increases an amount of noise removal as approaching the maximum value of the high-frequency noise power and decreases the amount of noise removal as deviating from the maximum value of the high-frequency noise power.

Figure 9:
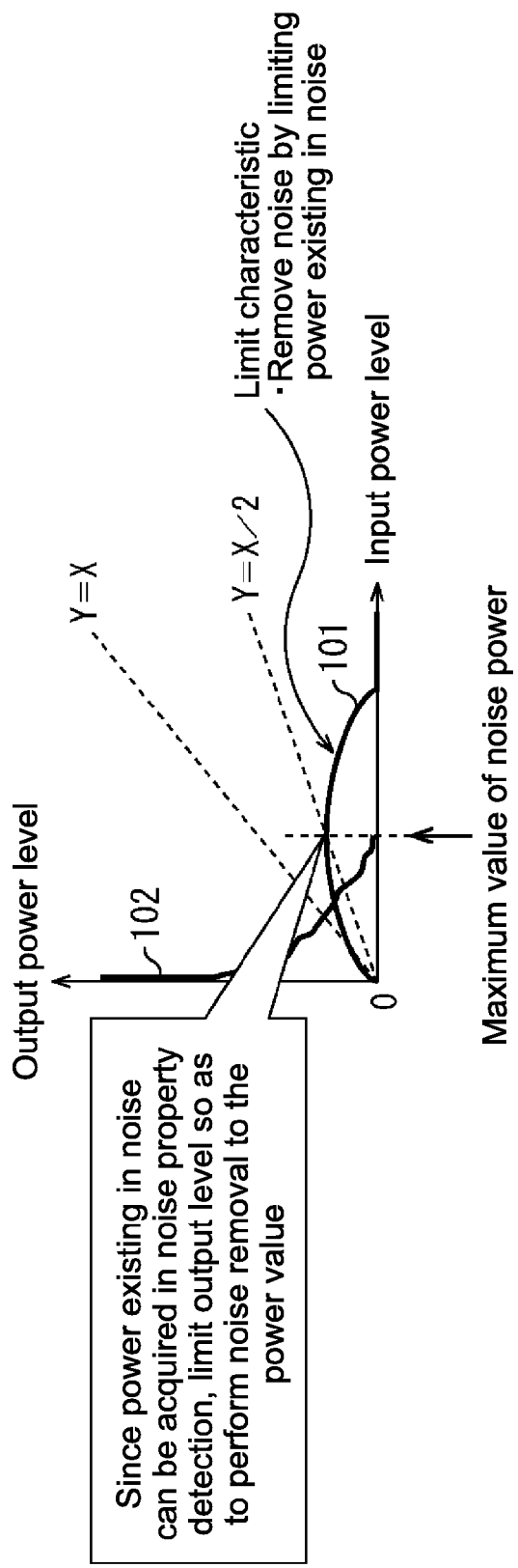
FIG. 9 shows an example of a state in which noise is reduced based on a noise reduction in a time direction.

FIG. 9 shows noise removal processing performed by the correction section 82.

In FIG. 9, a function 101 represents a removal amount representing a degree of removing noise and a function 102 represents an output of the corrected high-frequency power level obtained by correcting the high-frequency power level inputted from the correction section 82 according to the removal amount.

As with the function 102, the correction section 82 supplies, to the band synthesis section 86, a high-frequency correction power level obtained by largely correcting the high-frequency power level from the band separation section 81 as approaching the maximum value of the high-frequency noise power.

It should be noted that the correction sections 83 to 85 conduct processing similar to the correction section 82.

That is, for example, among the intermediate/high-frequency power levels from the band separation section 81, the correction section 83 performs noise removal processing similar to the correction section 82 for the intermediate/high-frequency power level less than or equal to the maximum value of the intermediate/high-frequency noise power from the histogram measurement section 63 and supplies the resultant intermediate/high-frequency correction power level to the band synthesis section 86.

Moreover, for example, among the intermediate/low-frequency power levels from the band separation section 81, the correction section 84 performs noise removal processing similar to the correction section 82 for the intermediate/low-frequency power level less than or equal to the maximum value of the intermediate/low-frequency noise power from the histogram measurement section 64 and supplies the resultant intermediate/low-frequency correction power level to the band synthesis section 86.

Further, for example, among the low-frequency power levels from the band separation section 81, the correction section 85 performs noise removal processing similar to the correction section 82 for the low-frequency power level less than or equal to the maximum value of the low-frequency noise power from the histogram measurement section 65 and supplies the resultant low-frequency correction power level to the band synthesis section 86.

The band synthesis section 86 combines the high-frequency correction power level from the correction section 82, the intermediate/high-frequency correction power level from the correction section 83, the intermediate/low-frequency correction power level from the correction section 84, and the low-frequency correction power level from the correction section 85 and supplies the resultant correction amount A to the mixing section 48. The correction amount A is calculated for each pixel of the frame n.

[Details of Spatial Direction NR Section 47]

Figure 10:
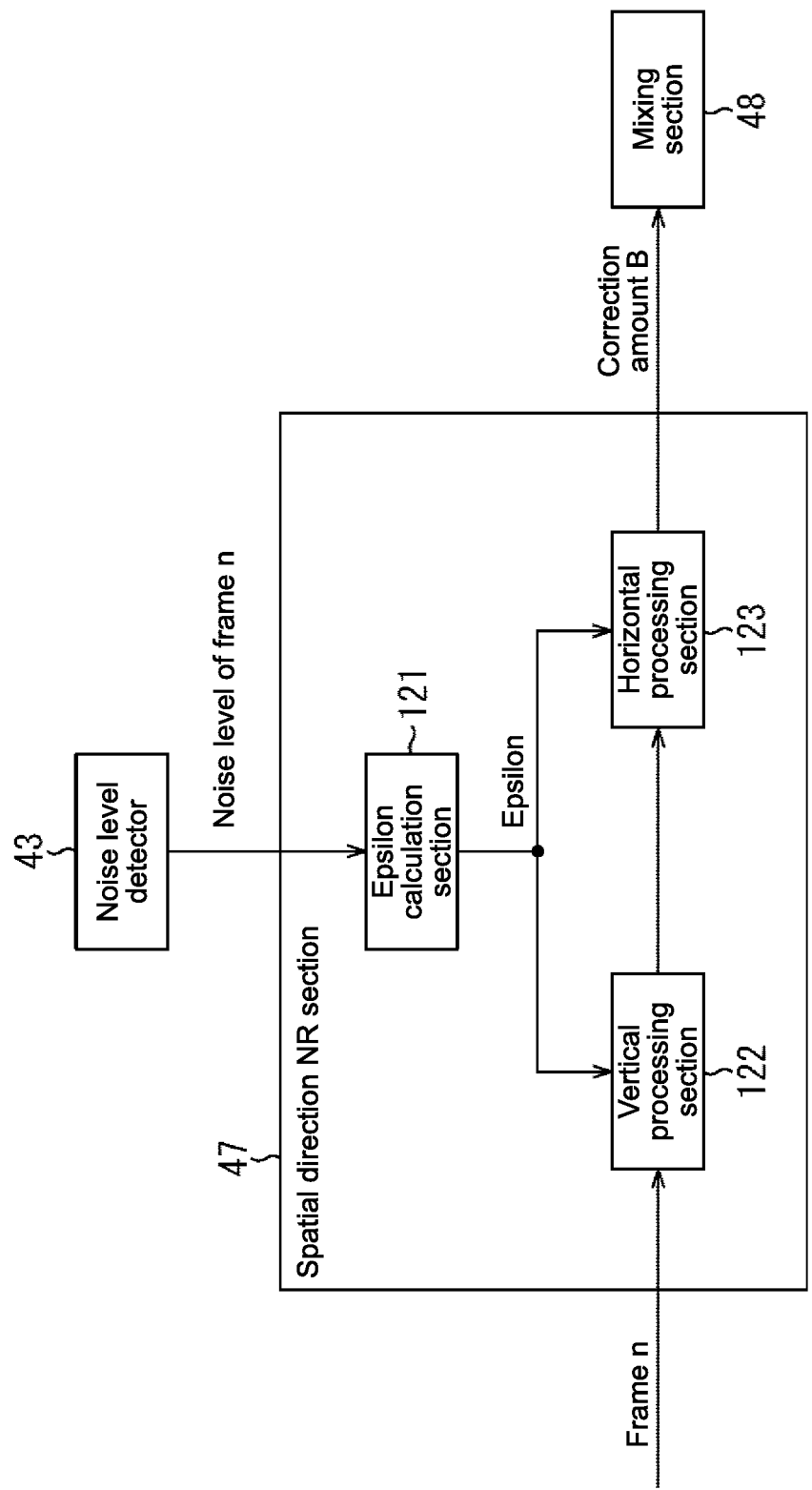
FIG. 10 is a block diagram showing a configuration example of a spatial direction NR section in detail.

FIG. 10 shows a configuration example of the spatial direction NR section 47 in detail.

The spatial direction NR section 47 includes an epsilon calculation section 121, a vertical processing section 122, and a horizontal processing section 123.

Figure 11:
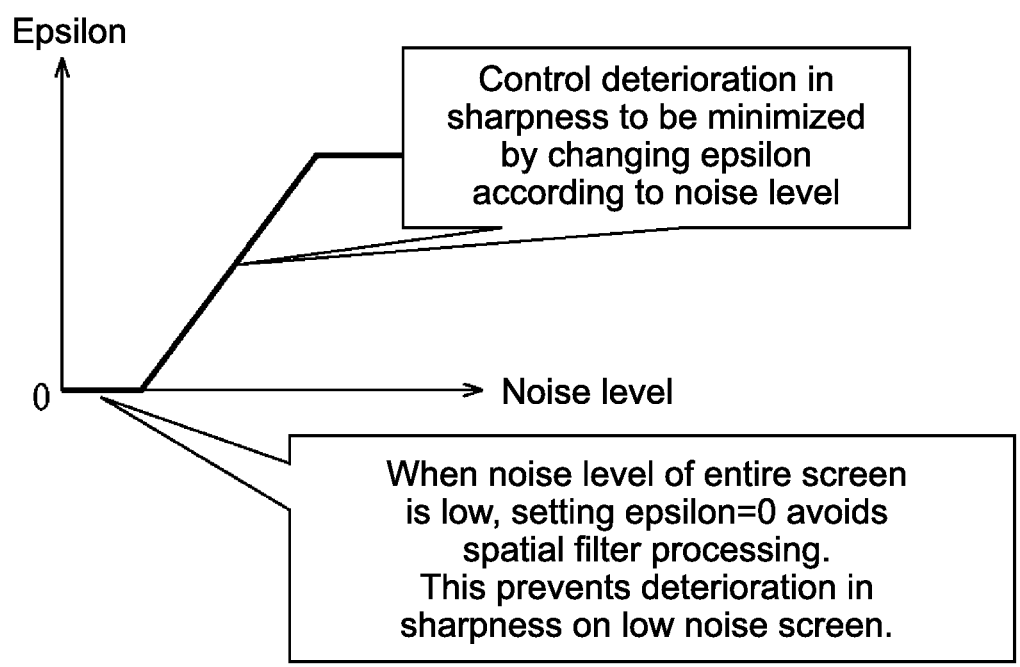
FIG. 11 is a diagram showing an example of a state in which an epsilon is determined in accordance with the noise level.

As shown in FIG. 11, the epsilon calculation section 121 calculates a value $\epsilon$ (epsilon) used for an epsilon filter based on the noise level from the noise level detector 43 and supplies the value to the vertical processing section 122 and the horizontal processing section 123.

The vertical processing section 122 performs filter processing, using the epsilon filter in a vertical direction, for the frame n from the imaging section not shown. That is, for example, the vertical processing section 122 focuses on each pixel of the frame n from the imaging section not shown and calculates an absolute value of the difference in pixel values between the focused pixel and a pixel adjacent in a vertical direction.

Then, when the calculated absolute value of the difference is not greater than or equal to the value $\epsilon$ from the epsilon calculation section 121, the vertical processing section 122 performs filter processing, using a low-pass filter, for the target pixel on the frame n. It should be noted that when the calculated absolute value of the difference is greater than or equal to the value $\epsilon$ from the epsilon calculation section 121, the vertical processing section 122 does not perform filter processing.

The vertical processing section 122 focuses on all the pixels on the frame n and subsequently supplies the processed frame n to the horizontal processing section 123.

The horizontal processing section 123 performs filter processing, using the epsilon filter in a horizontal direction, for the frame n from the vertical processing section 122. That is, for example, the horizontal processing section 123 focuses on each pixel of the frame n from the vertical processing section 122 and calculates the absolute value of the difference in pixel values between the focused pixel and a pixel adjacent in a horizontal direction.

Then, when the calculated absolute value of the difference is not greater than or equal to the value $\epsilon$ from the epsilon calculation section 121, the horizontal processing section 123 performs filter processing, using the low-pass filter, for the target pixel on the frame n. It should be noted that when the calculated absolute value of the difference is greater than or equal to the value ε from the epsilon calculation section 121, the horizontal processing section 123 does not perform filter processing.

The horizontal processing section 123 focuses on all the pixels on the frame n and subsequently supplies the luminance value of each pixel on the processed frame n to the mixing section 48 as the correction amount B for each pixel of the frame n.

[Details of Mixing Section 48]

Figure 12:
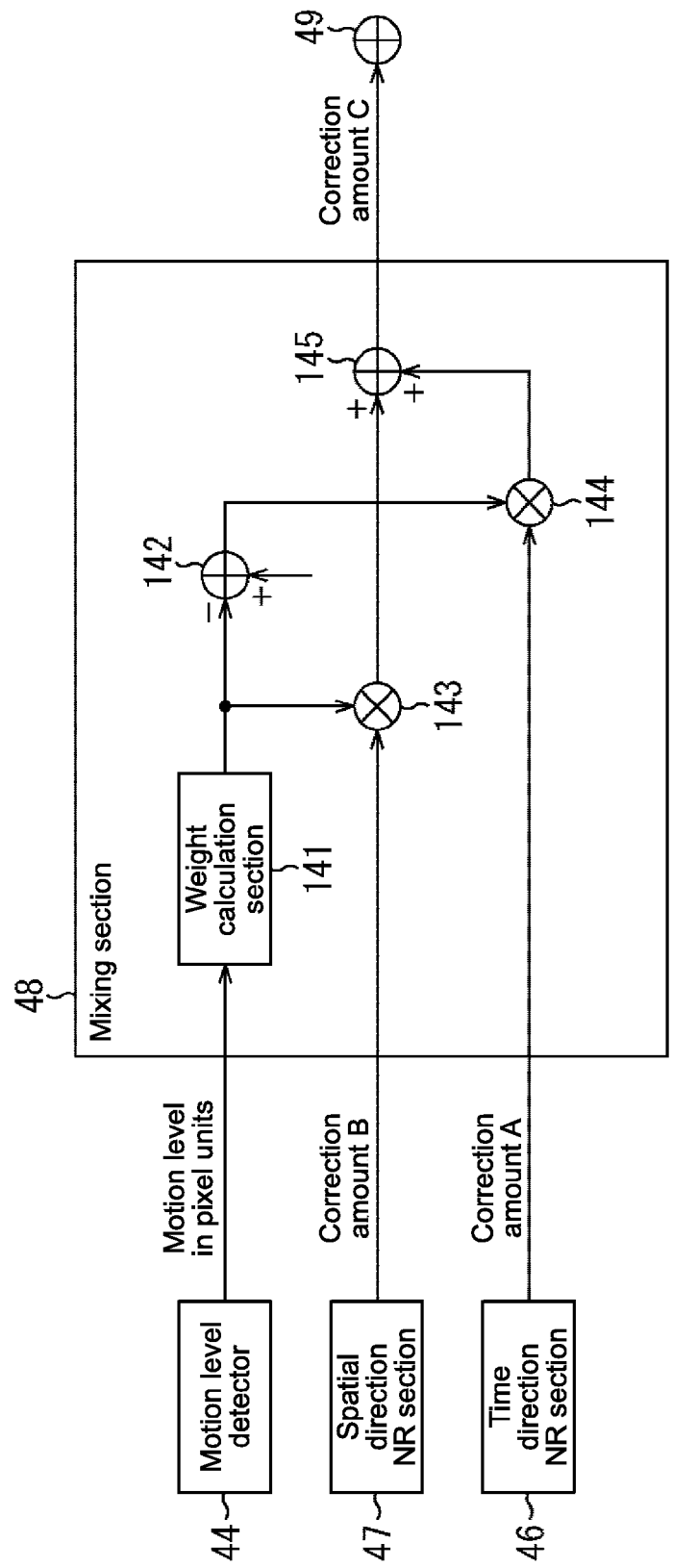
FIG. 12 is a block diagram showing a configuration example of a mixing section in detail.

FIG. 12 shows a configuration example of the mixing section 48 in detail.

The mixing section 48 includes a weight calculation section 141, a subtraction section 142, a multiplying section 143, and a multiplying section 144, and an adding section 145.

The weight calculation section 141 calculates, for each pixel, a weight α of the correction amount B multiplied by the luminance value Y(x,y) based on the motion level for each pixel of the frame n from the motion level detector 44 and supplies the calculated result to the subtraction section 142 and the multiplying section 143.

The subtraction section 142 subtracts, from a previously stored value 1, the weight α obtained from the weight calculation section 141 and supplies the resultant weight (1−α) to the multiplying section 144.

The multiplying section 143 multiplies the weight α obtained from the weight calculation section 141 for the correction amount B from the spatial direction NR section 47 and supplies the multiplied result (α×B) to the adding section 145.

The multiplying section 144 multiplies the weight (1−α) obtained from the subtraction section 142 for the correction amount A from the time direction NR section 46 and supplies the multiplied result {(1−α)×A} to the adding section 145.

The adding section 145 adds the multiplied result (α×B) obtained from the multiplying section 143 and the multiplied result {(1−α)×A} obtained from the multiplying section 144 and supplies the added result {(1−α)×A+α×B} to the correction section 49 as the correction amount C.

Figure 13:
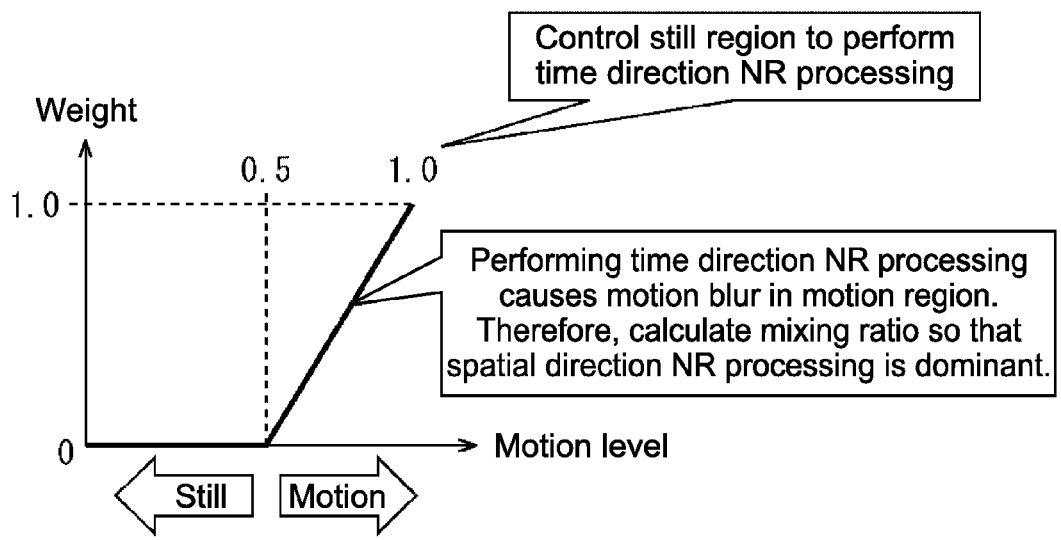
FIG. 13 is a diagram showing an example of a state in which weight representing a degree of mixing by the mixing section is determined.

That is, as shown in FIG. 13, the mixing section 48 determines the weight α of the correction amount B according to the motion level of each pixel of the frame n.

[Explanation of Operation of Image Processing Apparatus 21]

Figure 14:
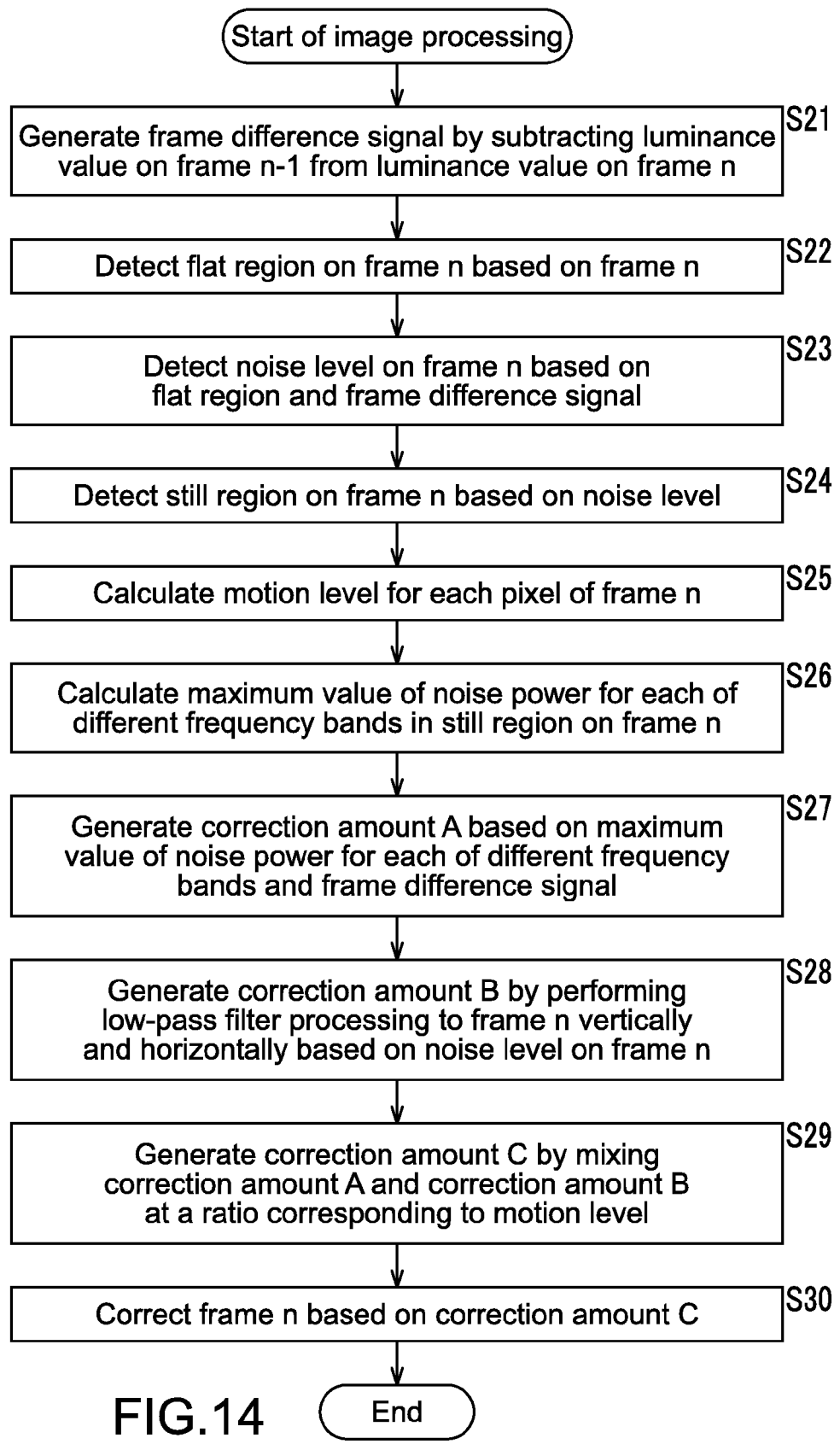
FIG. 14 is a flowchart for explaining image processing performed by the image processing apparatus shown in FIG. 1.

Next, with reference to the flowchart in FIG. 14, the image processing conducted by the image processing apparatus 21 will be described.

The image processing is started when a frame n including a moving image acquired by imaging by the imaging section not shown is supplied.

In step S21, the difference calculation section 41 subtracts the luminance value Y(x,y)' on the frame n−1 from the luminance value Y(x,y) on the frame n inputted from the imaging section not shown and supplies the resultant difference value diffy(x,y) to the noise level detector 43 through the time direction NR section 46 as the frame difference signal.

In step S22, the flatness detector 42 focuses on each pixel p(x,y) of the frame n inputted from the imaging section not shown and calculates the spatial variance var0 representing a variance of the luminance value Y(x,y) of the focused target pixel p(x,y) by the following expressions (1) and (2).

Moreover, the flatness detector 42 focuses on all the pixels p(x,y) on the frame n and subsequently detects the flatness f(x,y) for each pixel p(x,y) based on the spatial variance var0 calculated for each pixel p(x,y) on the frame n.

Then, the flatness detector 42 detects the flat region D(x,y) on the frame n based on the flatness f(x,y) detected for each pixel p(x,y) on the frame n and supplies it to the noise level detector 43.

In step S23, among the plurality of difference values diffy(x,y) as the frame difference signal from the difference calculation section 41, the noise level detector 43 calculates the time variance var1 representing a variance of the difference value diffy(x,y) corresponding to the flat region D(x,y) based on the difference value diffy(x,y) corresponding to the flat region D(x,y) from the flatness detector 42 by the expressions (3) and (4).

Then, as shown in FIG. 2, the noise level detector detects the noise level of the frame n based on a distribution of the calculated time variance var1 and supplies it to the motion level detector 44 and the spatial direction NR section 47.

In step S24, the motion level detector 44 calculates the time variance var1 of each pixel p(x,y) on the frame n based on the difference value diffy(x,y) as the frame difference signal from the difference calculation section 41 by the expressions (3) and (4).

Then, the motion level detector 44 detects the still region Ds(x,y) on the frame n based on whether or not the calculated time variance var1 of each pixel p(x,y) on the frame n is equal to or less than the noise level supplied from the noise level detector 43 and supplies it to the noise property detector 45.

In step S25, as shown in FIG. 3, the motion level detector 44 normalizes (divides) the time variance var1 of each pixel p(x,y) on the frame n by a maximum time variance max(var1), detects the motion level of each pixel, and supplies it to the mixing section 48.

In step S26, among difference values diffy(x,y) as the frame difference signal from the difference calculation section 41, the noise property detector 45 detects the noise property information of the still region Ds(x,y) based on the difference value diffy(x,y) corresponding to the still region Ds(x,y) from the motion level detector 44 and supplies it to the time direction NR section 46.

In step S27, the time direction NR section 46 calculates the correction amount A based on the difference value diffy(x,y) as the frame difference signal from the difference calculation section 41 and the noise property information from the noise property detector 45 and supplies the calculated amount to the mixing section 48.

In step S28, the spatial direction NR section 47 calculates the correction amount B based on the frame n from the imaging section not shown and the noise level from the noise level detector 43 and supplies the calculated amount to the mixing section 48.

In step S29, the mixing section 48 mixes, at a predetermined ratio, the correction amount A from the time direction NR section 46 and the correction amount B from the spatial direction NR section 47 for each pixel on the frame n based on the motion level for each pixel of the frame n from the motion level detector 44 and supplies a correction amount C obtained by the mixed result to the correction section 49.

In step S30, the correction section 49 corrects the frame n from the imaging section not shown based on the correction amount C from the mixing section 48 and supplies it to the hard disk not shown and the like for storage. After all the frames n from the imaging section not shown are processed, the image processing is completed.

As described above, according to the image processing, since the still region is detected depending on the noise level, it is possible to accurately detect the still region regardless of how much noise is generated in the frame.

Moreover, the motion level detector 44 can detect the motion region with the still region Ds(x,y) or in place of the still region Ds(x,y) on the frame n based on whether or not the time variance var1 of each pixel p(x,y) on the frame n is equal to or less than the noise level from the noise level detector 43.

In this case as well, it is possible to accurately detect the motion region regardless of how much noise is generated in the frame n.

Therefore, since the still region and the motion region on the frame n can be accurately detected, it is possible to appropriately remove noise from the still region and the motion region. Accordingly, for example, motion blur and the like caused by erroneously performing noise removal from the motion region in a time direction can be prevented.

Further, according to the image processing, the noise property information is detected from the still region where the difference value diffy(x,y) changes due to only noise. Therefore, for example, the noise property information can be more accurately detected in comparison with a case where the noise property information is detected from the motion region where the difference value diffy(x,y) changes due to the motion of the object as well as the noise.

Therefore, for example, it is possible to precisely remove various noises such as a transmission noise generated due to a sampling error during analog to digital (AD) conversion, a weak electric field noise generated due to a tuner and the like, a sensor noise generated due to an imaging device of a camera, a noise generated due to deterioration by MPEG compression, and a noise generated due to degradation in frequency by scaling a frame in a predetermined size.

2. Second Embodiment

[Configuration Example of Image Processing Apparatus 161]

Figure 15:
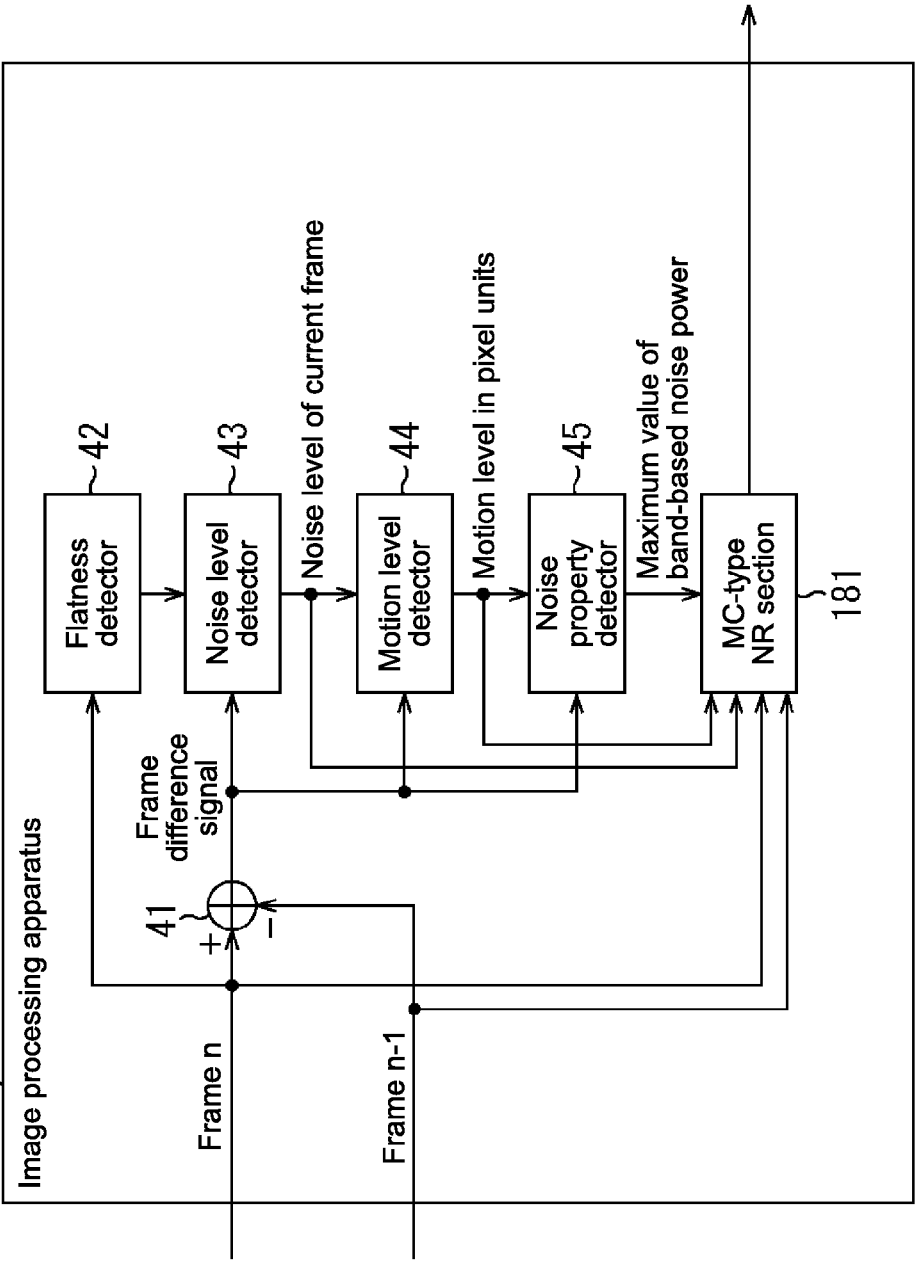
FIG. 15 is a block diagram showing a configuration example of an image processing apparatus according to a second embodiment.

FIG. 15 illustrates a configuration example of an image processing apparatus 161 according to the second embodiment.

In the image processing apparatus 161, the same signs are given to components formed in the same manner as the image processing apparatus 21 shown in FIG. 1, and therefore, explanation thereof will be appropriately omitted below.

That is, the image processing apparatus 161 is formed in the same manner as the image processing apparatus 21 except that an MC-type NR section 181 is provided instead of the time direction NR section 46 through the correction section 49 in FIG. 1.

The MC-type NR section 181 performs motion compensation (MC-type) noise removal (reduction).

That is, for example, the MC-type NR section 181 removes the noise generated in the frame n based on the frame n−1 and the frame n from the imaging section not shown, the noise level from the noise level detector 43, the motion level of each pixel from the motion level detector 44, and the noise property information from the noise property detector 45 and supplies the noise-removed frame n to the hard disk not shown and the like for storage.

Specifically, for example, when the noise level from the noise level detector 43 is less than a predetermined threshold, the MC-type NR section 181 determines that the frame n has little noise.

When the frame n has little noise, the accuracy in detection of the still region and the motion region by use of the motion vector is increased in comparison with the case where the still region and the like are detected as described in the first embodiment.

Therefore, in this case, for example, the MC-type NR section 181 separates the frame n from the imaging section not shown into a plurality of blocks. Moreover, the MC-type NR section 181 detects, for each of the plurality of blocks on the frame n, the motion vector representing the motion of the block based on the frame n−1 and the frame n from the imaging section not shown.

Then, the MC-type NR section 181 detects whether each block is the still region or the motion region based on the motion vector for each of the plurality of blocks.

The MC-type NR section 181 performs noise removal processing in the spatial direction for the block detected as the motion region, with strength corresponding to the noise level from the noise level detector 43.

Moreover, the MC-type NR section 181 performs, for each frequency component, noise removal processing in the time direction for the block detected as the still region, with strength corresponding to the noise property information from the noise property detector 45.

Further, for example, when the noise level from the noise level detector 43 is greater than or equal to a predetermined threshold, the MC-type NR section 181 determines that the frame n has much noise.

When the frame n has much noise, the motion vector can be erroneously detected, so that the MC-type NR section 181 removes the noise on the frame n by conducting processing similar to the time direction NR section 46 through the correction section 49 in FIG. 1.

In the MC-type NR section 181 having this structure, since the still region and the motion region can be accurately detected, it is possible to remove noise so as to decrease motion blur remarkably.

Moreover, when the frame n has much noise, the MC-type NR section 181 conducts processing similar to the time direction NR section 46 through the correction section 49 in FIG. 1, so that it is possible to prevent (suppress) erroneous detection of the motion vector due to the noise generated on the block.

Therefore, for example, the MC-type NR section 181 can prevent problems such as noise burst and degradation of a horizontal line which are generated when it is difficult to appropriately remove the noise from the still region and the motion region due to the erroneous detection of the motion vector.

In this case, the noise burst means a phenomenon that the noise generated on the frame n repeatedly stops and starts. The degradation of the horizontal line means a phenomenon that a contour of the horizontal line existing in a block on the frame n is disordered.

3. Modifications

In the first and second embodiments, the difference value diffy(x,y) is calculated by subtracting the luminance value Y(x,y)' of the frame n−1 from the luminance value Y(x,y) of the frame n in the difference calculation section 41. However, a method of calculating the difference value diffy(x,y) is not limited to the method described above.

That is, for example, in the difference calculation section 41, the difference value diffy(x,y) may be calculated by subtracting a luminance value Y(x,y)" of the frame n+1 from the luminance value Y(x,y) of the frame n.

The present technology can be configured as follows.

(1) An image processing, including: a flatness detector configured to detect a flat region where pixel values of pixels on a first image are flat based on variances of the pixel values of the pixels constituting the first image inputted; a difference calculation section configured to calculate a difference between the pixel values of the pixels corresponding to the first image and a second image which continues before or after the first image; a noise level detector configured to detect a noise level indicating a statistic noise amount of noise generated in each pixel constituting the first image based on the variances of the difference corresponding to each pixel constituting the flat region on the first image; and a motion detector configured to detect at least one of a still region indicating a region where an object on the first image is still and a motion region indicating a region where the object is moving, based on a comparison result between the variances of the difference corresponding to each pixel constituting the first image and the noise level.

(2) The image processing apparatus according to Item (1), further including a noise property detector configured to detect noise property information indicating property of noise generated in the still region based on the difference corresponding to each pixel constituting the still region on the first image.

(3) The image processing apparatus according to Item (2), in which the noise property detector detects, as the noise property information, a maximum value of a plurality of power levels obtained by separating the difference corresponding to each pixel constituting the still region into predetermined frequency components, the maximum value being obtained for each of the frequency components.

(4) The image processing apparatus according to Item (2) or (3), further including a noise reduction section configured to reduce the noise generated in the first image based on at least one of the noise property information and the noise level.

(5) The image processing apparatus according to Item (4), in which the noise reduction section further includes a first correction amount calculation section configured to calculate a first correction amount for reducing the noise generated in the still region based on the noise property information, a second correction amount calculation section configured to calculate a second correction amount for reducing the noise generated in the motion region based on the noise level, a mixing section configured to mix the first correction amount and the second correction amount, and a correction section configured to correct the pixel value of each pixel of the first image based on a third correction amount obtained by mixing in the mixing section.

(6) The image processing apparatus according to Item (1), in which the noise level detector detects, as the noise level, a mode of the variance among the variances of the difference corresponding to each pixel constituting the flat region on the first image.

It should be noted that the series of processing described above may be performed by hardware or may be performed by software. When the series of processing is performed by software, the programs constituting the software are installed from a program recording medium into a computer incorporated in dedicated hardware or into a general-purpose computer capable of installing various programs to execute various functions, for example.

[Configuration Example of Computer]

Figure 16:
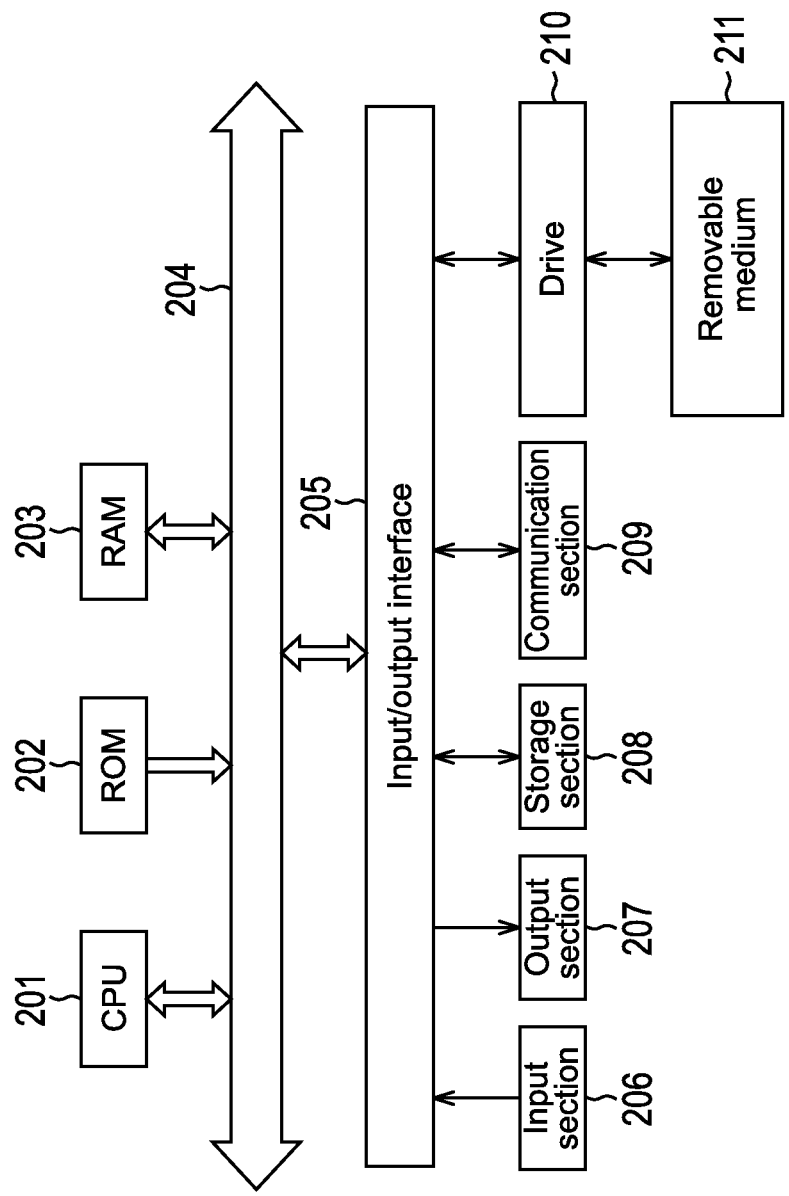
FIG. 16 is a block diagram showing a configuration example of a computer.

FIG. 16 is a block diagram showing a configuration example of the hardware of the computer for carrying out the series of processing described above with the programs.

A central processing unit (CPU) 201 executes various types of processing in accordance with a program stored in a Read Only Memory (ROM) 202 or a storage section 208. A program to be executed by the CPU 201, data and the like are suitably stored into a Random Access Memory (RAM) 203. The CPU 201, the ROM 202, and the RAM 203 are connected to one another by a bus 204.

Also, an input/output interface 205 is connected to the CPU 201 through the bus 204. An input section 206 including a keyboard, a mouse, a microphone, and the like and an output section 207 including a display unit, a speaker, and the like are connected to the input/output interface 205. The CPU 201 executes various types of processing in accordance with an instruction inputted from the input section 206. Then, the CPU 201 outputs a result of the processing to the output section 207.

The storage section 208 connected to the input/output interface 205 includes, for example, a hard disk and stores a program to be executed by the CPU 201 and various types of data. A communication section 209 communicates with an external apparatus connected thereto through a network or a network such as a local area network.

A program may be acquired through the communication section 209 and stored into the storage section 208.

A drive 210 is connected to the input/output interface 205. When a removable medium 211 such as a magnetic disk, an optical disk, a magneto-optical disk, or a semiconductor memory is loaded into the drive 210, the drive 210 drives the removable medium 211. Thereupon, the drive 210 acquires a program, data, and the like recorded on the removable medium 211. The acquired program or data is transferred to and stored into the storage section 208 as occasion demands.

The program recording medium on which a program to be installed into a computer and placed into an executable condition by the computer is recorded (stored) may be, for example, as shown in FIG. 16, a removable medium 211 in the form of a package medium formed from a magnetic disk (including a flexible disk), an optical disk (including a CD-ROM (Compact Disk-Read Only Memory) and a DVD (Digital Versatile Disc)), a magneto-optical disk (including an MD (Mini-Disc)), or a semiconductor memory. Or, the program recording medium may be formed as the ROM 202, a hard disk included in the storage section 208, or the like in which the program is stored temporarily or permanently. Recording of the program into or on the program recording medium is carried out, as occasion demands, through the communication section 209 which is an interface such as a router and a modem, making use of a wired or wireless communication medium such as a local area network, a network or a digital satellite broadcast.

It should be noted that, in the present specification, the steps which describe the series of processing described above may be but need not necessarily be processed in a time series in the order as described, and include processing executed in parallel or individually without being processed in a time series.

Further, embodiments of the present disclosure are not limited to the first and second embodiments described hereinabove, but variable alterations and modifications can be made without departing from the spirit and scope of the present disclosure.

What is claimed is:

1. An image processing apparatus, comprising:
a flatness detector configured to detect a flat region where pixel values of pixels on a first image are flat, based on variances of the pixel values of the pixels constituting the first image inputted;
a difference calculation section configured to calculate a difference between the pixel values of the pixels corresponding to the first image and a second image which continues before or after the first image;
a noise level detector configured to detect a noise level indicating a statistic noise amount of noise generated in each pixel constituting the first image based on the variances of the difference corresponding to each pixel constituting the flat region on the first image; and a motion detector configured to detect at least one of a still region indicating a region where an object on the first image is still and a motion region indicating a region where the object is moving, based on a comparison result between the variances of the difference corresponding to each pixel constituting the first image and the noise level.

2. The image processing apparatus according to claim 1, further comprising a noise property detector configured to detect noise property information indicating property of noise generated in the still region based on the difference corresponding to each pixel constituting the still region on the first image.

3. The image processing apparatus according to claim 2, wherein the noise property detector detects, as the noise property information, a maximum value of a plurality of power levels obtained by separating the difference corresponding to each pixel constituting the still region into predetermined frequency components, the maximum value being obtained for each of the frequency components.

4. The image processing apparatus according to claim 2, further comprising a noise reduction section configured to reduce the noise generated in the first image based on at least one of the noise property information and the noise level.

5. The image processing apparatus according to claim 4, wherein the noise reduction section includes
a first correction amount calculation section configured to calculate a first correction amount for reducing the noise generated in the still region based on the noise property information,
a second correction amount calculation section configured to calculate a second correction amount for reducing the noise generated in the motion region based on the noise level,
a mixing section configured to mix the first correction amount and the second correction amount, and
a correction section configured to correct the pixel value of each pixel of the first image based on a third correction amount obtained by mixing in the mixing section.

6. The image processing apparatus according to claim 1, wherein the noise level detector detects, as the noise level, a mode of the variance among the variances of the difference corresponding to each pixel constituting the flat region on the first image.

7. An image processing method for an image processing apparatus configured to process an image to be inputted, the method comprising: by the imaging processing apparatus, detecting a flat region where pixel values of pixels on a first image are flat based on variances of the pixel values of the pixels constituting the first image inputted;

calculating a difference between the pixel values of the pixels corresponding to the first image and a second image which continues before or after the first image;

detecting a noise level indicating a statistic noise amount of noise generated in each pixel constituting the first image based on the variances of the difference corresponding to each pixel constituting the flat region on the first image; and detecting at least one of a still region indicating a region where an object on the first image is still and a motion region indicating a region where the object is moving, based on a comparison result between the variances of the difference corresponding to each pixel constituting the first image and the noise level.

8. A non-transitory computer-readable medium having stored thereon a program that causes a computer to function as:

a flatness detector configured to detect a flat region where pixel values of pixels on a first image are flat based on variances of the pixel values of the pixels constituting the first image inputted;

a difference calculation section configured to calculate a difference between the pixel values of the pixels corresponding to the first image and a second image which continues before or after the first image;

a noise level detector configured to detect a noise level indicating a statistic noise amount of noise generated in each pixel constituting the first image based on the variances of the difference corresponding to each pixel constituting the flat region on the first image; and a motion detector configured to detect at least one of a still region indicating a region where an object on the first image is still and a motion region indicating a region where the object is moving, based on a comparison result between the variances of the difference corresponding to each pixel constituting the first image and the noise level.

* * * * *